Dec. 8, 1925.  1,564,591
A. LANSCHE
METHOD OF MANUFACTURING BACK CUT SCREW DIES MADE IN
TWO PARTS WITH FOUR CHASERS OR CUTTING EDGES
Filed June 9, 1924
*Fig. 1.*
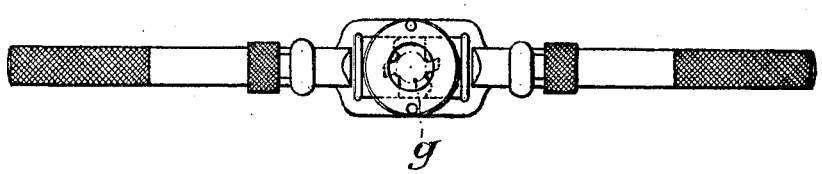
*Fig. 2.*    *Fig. 3.*
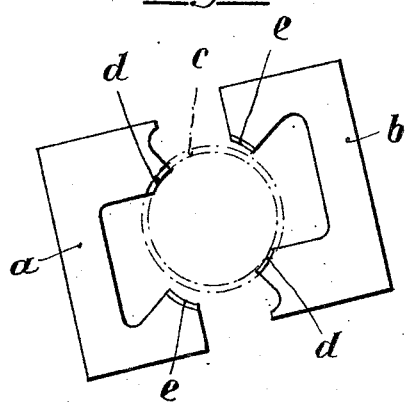    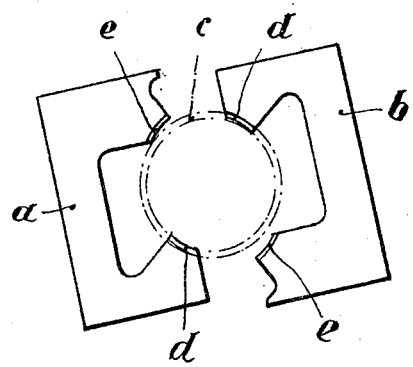
*Fig. 4.*
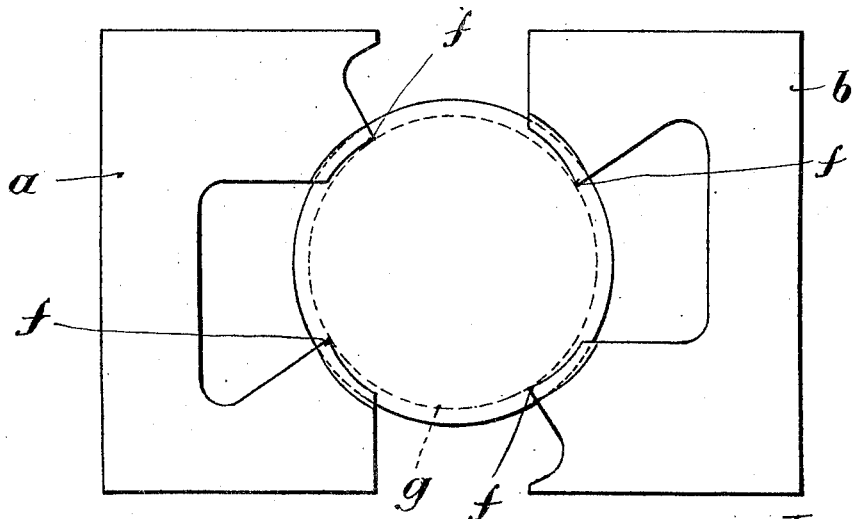
Inventor:
Albert Lansche
By
Attorney.

Patented Dec. 8, 1925.

1,564,591

UNITED STATES PATENT OFFICE.

ALBERT LANSCHE, OF STUTTGART, GERMANY.

METHOD OF MANUFACTURING BACK-CUT SCREW DIES MADE IN TWO PARTS WITH FOUR CHASERS OR CUTTING EDGES.

Application filed June 9, 1924. Serial No. 718,876.

*To all whom it may concern:*

Be it known that I, ALBERT LANSCHE, engineer, a citizen of Germany, residing at Stuttgart, Wurttemberg, Germany, have invented certain new and useful Improvements in Methods of Manufacturing Back-Cut Screw Dies Made in Two Parts With Four Chasers or Cutting Edges, of which the following is a specification.

The screw dies made in two parts with four chasers or cutting edges for screw stocks have been manufactured hitherto in this way viz, the screw thread is cut in the previously drilled die by means of a screw cutting tap, the diameter of which corresponds with or is larger than that of the cutting screw diameter. Dies so produced however, are not back cut so that they have many disadvantages. A back cutting it is true is known in connection with dies but exclusively in dies with only two cutting chasers.

The present invention relates to the manufacture of dies made in two parts with four back-cut chasers, so that on the one hand the advantages of the screw-stocks with four single chasers, such as greater capacity, easy faultless cutting even of different size screw thread diameters exist, as well as the advantages of the back-cut, that is to say the possibility of the subsequent grinding of the different chasers on the face when they have become blunt, the back-cut being retained permanently.

Now the method is carried out in this manner viz, the four cutting chasers are not cut as hitherto simultaneously but separately for which purpose a tap is used of a diameter smaller than the smallest screw thread diameter while the die parts are held in staggered relation.

The most advantageous way of carrying out the method is for the cutting chasers to be cut in pairs, first two chasers situated diametrically opposite are cut by the tap while the die parts are staggered, whereupon the die parts are staggered in the opposite sense so that the remaining chasers can be cut in the same manner. Thereby the surfaces of the chasers have a certain obliquity in relation to the screw tap, that is to say all four are at one and the same angle.

The method according to the present invention is illustrated by way of example in the drawing:

Fig. 1 is a plan of a screw stock furnished with the invention.

Figs. 2 and 3 illustrate in plan the two stages of operation in the cutting of the dies.

Fig. 4 is a greatly enlarged plan of the completely cut die.

The method according to the invention is carried out practically in this manner viz, that through transverse movement of the two die parts $a$ and $b$ two chasers $d$ situated diametrically opposite one another in relation to the centre of the screw cap $c$ as shown in Fig. 2 are cut together. The parts $a$ and $b$ are now moved in relation to one another so that as shown in Fig. 3 the other two chasers $e$ can be cut with the tap in the same manner. The diameter of the tap $c$ is smaller than the smallest screw thread diameter to be cut, and the parts $a$ and $b$ as shown in Figs. 2 and 3 are placed obliquely in relation to the longitudinal axis.

If now the two die parts $a$ and $b$ are adjusted to the central axis, as shown in Fig. 4, all four chasers take hold of the work $g$ only by their leading edges $f$, that is to say they are situated at a certain angle which renders possible a free and easy development of a cut.

I claim:—

1. A method of manufacturing two part screw dies, each having a plurality of back cut chasers, consisting in the steps of simultaneously cutting a chaser of each part constituting a pair of chasers which are diametrically opposite.

2. A method of manufacturing two part screw dies, each having two chasers, consisting in the steps of cutting a diametrically opposite chaser of each part; and then cutting the other diametrically opposite chasers of each part.

3. A method of manufacturing two part screw dies, each having two chasers, consisting in the steps of simultaneously cutting a diametrically opposite chaser of each part; and then simultaneously cutting the other diametrically opposite chaser of each part.

4. A method of manufacturing two part screw dies, each having two chasers, consisting in the steps of arranging the parts in an oblique position relative to the longitudinal axis of the stock; and then simultaneously cutting a diametrically opposite chaser of each part.

5. A method of manufacturing two part screw dies, each having two chasers, consisting in the steps of arranging the two parts so that a chaser of one part and the diametrically opposite chaser of the other part are cut simultaneously; mutually and transversely moving the die parts parallel to one another; and then cutting the other two chasers which are diametrically opposite.

In testimony whereof I affix my signature.

ALBERT LANSCHE.